United States Patent
Han et al.

(10) Patent No.: US 9,569,042 B2
(45) Date of Patent: Feb. 14, 2017

(54) ELECTROSTATIC CAPACITIVE TYPE TOUCH SCREEN PANEL

(71) Applicant: LG DISPLAY CO., LTD., Seoul (KR)

(72) Inventors: Jonghyun Han, Paju-si (KR); Byungkoo Kang, Paju-si (KR); Dongsup Kim, Incheon (KR); Sohyung Lee, Goyang-si (KR); Sungyong Cho, Seoul (KR); Daewoong Chun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 40 days.

(21) Appl. No.: 14/080,641

(22) Filed: Nov. 14, 2013

(65) Prior Publication Data

US 2014/0139481 A1    May 22, 2014

(30) Foreign Application Priority Data

Nov. 16, 2012 (KR) ........................ 10-2012-0130523

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ............... G06F 2203/04111; G06F 3/044
USPC ............... 178/18.06; 345/173, 174
See application file for complete search history.

(56) References Cited

U.S. PATENT DOCUMENTS

| 2011/0025639 A1* | 2/2011 | Trend ...................... G06F 3/044 345/174 |
| 2012/0044165 A1* | 2/2012 | Kwak et al. .................. 345/173 |
| 2012/0182254 A1* | 7/2012 | Jang .................... G06F 3/03545 345/174 |

FOREIGN PATENT DOCUMENTS

| CN | 102375596 A | 3/2012 |
| EP | 2237135 A2 | 10/2010 |
| TW | 201108080 A1 | 3/2011 |

OTHER PUBLICATIONS

Annotated figure of above noted reference Kwak.*

* cited by examiner

*Primary Examiner* — Amr Awad
*Assistant Examiner* — Aaron Midkiff
(74) *Attorney, Agent, or Firm* — Birch, Stewart, Kolasch & Birch, LLP

(57) ABSTRACT

A touch screen panel includes a plurality of first touch electrode serials arranged in a first direction and a plurality of second touch electrode serials arranged in a second direction crossing over the first direction, and electrically insulated from the plurality of first electrode serials. The first touch electrode serial includes a plurality of first touch electrodes connected in serial, and the second touch electrode serial includes a plurality of second touch electrodes connected in serial. The first touch electrode has a first stem portion, and a plurality of first branch portions outwardly extended from both sides of the first stem portion. The second touch electrodes has a second stem portion, and a plurality of second branch portions outwardly extended from both sides of the second stem portion.

20 Claims, 10 Drawing Sheets

ELECTROSTATIC CAPACITIVE TYPE TOUCH SCREEN PANEL

This application claims priority under 35 U.S.C. §119(a) to Korean Patent Application No. 10-2012-0130523 filed on Nov. 16, 2012, which is incorporated by reference herein in its entirety.

BACKGROUND OF THE INVENTION

Field

This disclosure relates to an electrostatic capacitive type touch screen panel.

Related Art

In recent years, display devices, such as a liquid crystal display, an electroluminescent display, and a plasma display panel, having a quick response speed, low power consumption, and an excellent color reproduction rate, have been in the spotlight. These display devices have been used for various electronic products such as a television, a monitor for a computer, a laptop computer, a mobile phone, a display unit of a refrigerator, a personal digital assistant, and an automated teller machine. In general, these display devices interface with various input devices such as a keyboard, a mouse, and a digitizer. However, in many types of input devices, a user has to learn how to use the input devices, making it difficult for the user to properly operate the products. Furthermore, the input device occupies a separate space, which increases the overall size of the appliances or devices incorporating these input devices. Thus, there has been an increasing demand for simple and convenient input devices. A touch screen panel is an input device that mitigates or removes such drawbacks in other types of input devices. The touch screen panel allows users to provide user input by directly touching the screen with the users' finger or a pen.

The touch screen panel is currently being applied to various display devices, because it has simple structure and robust operation, and the user can perform an input action without using a separate input device, and can quickly and easily manipulate the devices through contents displayed on a screen.

Touch screen panels are classified into a resistive type, a capacitive type, an electromagnetic type and so on according to a detection method of a touched position. The resistive type touch screen panel detects a touched position by a voltage gradient according to resistance in a state that a DC voltage is applied to metal electrodes formed on an upper plate or a low plate. The capacitive type touch screen panel senses a touched position according to a difference in capacitance created in an upper or lower plate when the user touches an equipotential conductive film formed on the upper or lower plate. The electromagnetic type touch screen panel detects a touched position by reading an LC value induced as an electromagnetic pen touches a conductive film.

Hereinafter, a related art electrostatic capacitive type touch screen panel will be described with reference to FIGS. 1 to 2B. FIG. 1 is a top plan view of a related art electrostatic capacitive type touch screen panel, FIG. 2A is a top plan view of a region R shown in FIG. 1 and FIG. 2B is a cross-sectional view taken along line I-I' of region R shown in FIG. 2A in which the related art electrostatic capacitive type touch screen panel is coupled with a display device.

Referring to FIGS. 1 to 2B, the related art electrostatic capacitive type touch screen panel includes a touch electrode forming part TA, a routing wire forming part RA, and a pad forming part PA.

The touch electrode forming part TA includes a plurality of first touch electrode serials TS1 to TS5 (touch driving electrode serials or touch sensing electrode serials) and second touch electrode serials RS1 to RS6 (touch sensing electrode serials or touch driving electrode serials) formed on a transparent substrate 10. The plurality of first touch electrode serials TS2 to TS5 are arranged in parallel in a first direction (e.g., the x-axis direction). The plurality of second electrode serials RS1 to TS6 are arranged in a second direction (e.g., the y-axis direction) to cross over the first electrodes TS.

Each of the first electrode serials TS1 to TS5 has a plurality of first electrode patterns Tx which are connected to each other. Each of the second electrode serials RS1 to RS6 has a plurality of second electrode patterns Rx and bridge patterns BP. Each of the bridge patterns BP connects two second electrode patterns Rx which are neighbored to each other. The neighbored two electrode patterns Rx are connected to each other by the bridge pattern BP exposed via contact holes formed in an insulation layer INS.

The routing wire forming part RA includes a plurality of first routing wires TW1 to TW5 and a plurality of second routing wires RW1 to RW6 which are formed outside the touch electrode forming part TA. The plurality of first routing wires TW1 to TW5 are connected with the first touch electrode serials TS1 to TS5, respectively, and the plurality of second routing wires RW1 to TW6 are connected with the second touch electrode serials RS1 to RS6, respectively.

The pad forming part PA includes a plurality of first pads TP1 to TP5 and a plurality of second pads RP1 to RP6. The plurality of first pads TP1 to TP5 are connected to the plurality of first touch electrode serials TS1 to TS5 via the plurality of first routing wires TW1 to TW5, respectively. The plurality of second pads RP1 to RP6 are connected to the plurality of second touch electrode serials RS1 to RS6 via the plurality of second routing wires RW1 to RW6, respectively.

In the related art electrostatic capacitive type touch screen panel, there is a variation of mutual capacitance between the first electrode pattern Tx and the second electrode at before and after a touch when user touches the touch electrode forming area TA by using conductor or fingers. Accordingly, it is possible to detect touch positions by using the variation of mutual capacitance between before and after of the touch.

In order to easily perceive a touch, it is advantaged the more the variation of mutual capacitance is large. In general, the related art touch screen panel has various mutual capacitances, such as a first mutual capacitance C1 generated by linear type near electric field between the first touch electrode serials TS1 to TS5 and the second touch electrode serials RS1 to RS6, a second capacitance C2 generated by curved type far electric field between them, and a parasitic capacitance C3 generated by electric field between the first and second touch electrode serials TS1 to TS5 and RS1 to TS6 and display electrodes (not shown) as shown in FIG. 2A.

The first mutual capacitance C1 is little affected by a touch, thus little to generate a variation of mutual capacitance between before and after the touch. The second mutual capacitance C2 is greatly affected by a touch. The parasitic capacitance C3 increases time constant which affects a charge characteristic between the first and second touch electrode serials TS1 to TS5 and RS1 to RS6, thereby reducing the charge characteristic. On the other hand, at areas excluding the touched area, the first and second mutual capacitance C1 and C2 are functioned as a parasitic capacitance, thereby lowering a touch sensibility.

In particular, in the related art touch screen panel, the parasitic capacitance C3 between the first touch electrode serials TS1 to TS5 and the second touch electrode serials RS1 to RS6 are large because the first and second electrode serials TS1 to TS5 and RS1 to RS6 have a similar size.

Also, in the related art touch screen panel, edges of the first touch electrode Tx and edges of the second touch electrode Rx opposite to each other are linearly formed in parallel as shown FIGS. 2A and 2B. An entire mutual capacitance formed between the first and second touch electrodes Tx and Rx is not sufficient because a path of mutual capacitance between the first and second touch electrodes Tx and Rx is formed in the shortest distance.

In the related art touch screen panel, there are some problems lowering touch sensibility because the parasitic capacitance is increased and the variation rate of the second mutual capacitance among the entire mutual capacitance is low.

SUMMARY OF THE INVENTION

Exemplary embodiments of this disclosure provide an electrostatic capacitive type touch screen panel capable of enhancing charge characteristic between the touch electrodes and electrodes of a display device by decreasing parasitic capacitance formed between them, and also enhancing touch sensibility of the touch screen panel by increasing a total length of edges of the touch driving electrode and touch sensing electrode opposite to each other.

In one aspect, there is a touch screen panel including a plurality of first touch electrode serials arranged in a first direction; and a plurality of second touch electrode serials arranged in a second direction crossing over the first direction, and electrically insulated from the plurality of first electrode serials, wherein each of the plurality of first touch electrode serials includes a plurality of first touch electrodes connected in serial, and the each of the plurality of second touch electrode serials includes a plurality of second touch electrodes connected in serial, wherein each of the plurality of first touch electrodes has a first stem portion, and a plurality of first branch portions outwardly extended from both sides of the first stem portion to form at least two concaves in one side of the first touch electrode, and wherein each of the plurality of second touch electrodes has a second stem portion, and a plurality of second branch portions outwardly extended from both sides of the second stem portion to be respectively received in the at least two concaves.

In the touch screen panel, the plurality of first branch portions includes a 1-1 branch portion extended from an upper part of the first stem portion to right side, a 1-2 branch portion extended from a middle part of the first stem portion to right side, a 1-3 branch portion extended from a lower part of the first stem portion to right side, a 1-4 branch portion extended from the upper part of the first stem portion to left side, a 1-5 branch portion extended from the middle part of the first stem portion to left side, and a 1-6 branch portion extended from the lower part of the first stem portion to left side, and a first concave the is formed by the 1-1 branch portion, the first stem portion and the 1-2 branch portion of the first touch electrode, a second concave is formed by the 1-2 branch portion, the first stem portion and the 1-3 branch portion, a third concave is formed by the 1-4 branch portion, the first stem portion and the 1-5 branch portion, and a 1-4 concave is formed by the 1-5 branch portion, the first stem portion and the 1-6 branch portion In the touch screen panel, the plurality of second branch portions includes a 2-1 branch portion of the second touch electrode formed at a predetermined distance from a top end of the second stem portion and extended from of the second stem portion to right side, a 2-2 branch portion formed at the predetermined distance from a bottom end of the second stem portion and extended from the second stem portion to right side, a 2-3 branch portion formed at the predetermined distance from the top end of the second stem portion and extended from the second stem portion to left side, and a 2-4 branch portion formed at the predetermined distance from the bottom end of the second stem portion and extended from the second stem portion to left side, and the 2-4 branch portion of the second touch electrode is disposed within the first concave of the first touch electrode, the 2-3 branch portion of another second touch electrode which is neighbored to the second touch electrode is disposed within the second concave of the first touch electrode, the 2-2 branch portion of the second touch electrode is disposed within the third concave of another first touch electrode which is neighbored to the first touch electrode, the 2-1 branch portion of the another second touch electrode which is neighbored to the second touch electrode is disposed within the fourth concave of the another first touch electrode which is neighbored to the first touch electrode.

In the touch screen panel, a top end of the first stem portion of the first touch electrode has a first slope surface which is upwardly inclined to right upper corner of the 1-1 branch portion, the 1-1 branch portion has a slope surface which is extended from the first slope surface and upwardly inclined to right upper corner of the 1-1 branch portion, and the top end of the first stem portion of the first touch electrode has a third slope surface which is upwardly inclined to left upper corner of the 1-4 branch portion, and the 1-4 branch portion has a slope surface which is extended from the third slope surface and upwardly inclined to left upper corner of the 1-4 branch portion In the touch screen panel, the lower end of the first stem portion of the first touch electrode has a second slope surface which is declined to right lower corner of the 1-3 branch portion, and the 1-3 branch portion has a slope surface which is extended from the second slope surface and declined to right lower corner of the 1-3 branch portion, and the lower end of the stem portion of the first touch electrode has a 1-4 slope surface which is declined to left lower corner of the 1-6 branch portion, and the 1-6 branch portion has a slope surface which is extended from the 1-4 slope surface and declined to left lower corner of the 1-6 branch portion.

In the touch screen panel, the top end of the first stem portion of the first touch electrode has a first slope surface which is upwardly inclined to left upper corner of the 1-1 branch portion, and the top end of the first stem portion of the first touch electrode has a third slope surface which is upwardly inclined to right upper corner of the 1-4 branch portion.

In the touch screen panel, the lower end of the first stem portion of the first touch electrode has a second slope surface which is declined to left lower corner of the 1-3 branch portion, and the lower end of the first stem portion of the first touch electrode has a fourth slope surface which is declined to right lower corner of the 1-6 branch portion.

In the touch screen panel, the 1-1 to 1-3 branch portions of the first touch electrode are symmetrical to the 1-4 to 1-6 branch portions of the first touch electrode, and the 2-1 and 2-2 branch portions of the second touch electrode are symmetrical to the 2-3 and 2-4 branch portions of the second touch electrode.

In the touch screen panel, a width of the second stem portion has a size of ⅕ to ⅗ of a length of the second touch electrode.

In the touch screen panel, a width of each of the 2-1 and 2-4 branch portions of the second touch electrode has a size of ¼ to ¾ a width of the second stem portion of the second touch electrode.

In the touch screen panel, a plurality of dummy electrodes are disposed in a space formed between the first touch electrode and the second touch electrode.

In the touch screen panel, the plurality of first touch electrodes are formed on a first surface of a transparent substrate and the plurality of second touch electrodes are formed on a second surface of the transparent substrate.

In the touch screen panel, the plurality of first touch electrodes and the plurality of second touch electrodes are formed on a window cover.

In the touch screen panel, the plurality of first touch electrodes are formed on a first flexible substrate, the plurality of second touch electrodes are formed on a second flexible substrate, and the first and second flexible substrate are attached to each other by a transparent file for an adhesive.

In the touch screen panel, the plurality of first touch electrodes are formed on a flexible substrate, the plurality of second touch electrodes are formed on a window cover, and the flexible substrate and the window cover are attached to each other by a transparent file for an adhesive In the touch screen panel, the plurality of first touch electrodes are formed on a first surface of a flexible substrate, the plurality of second touch electrodes are formed on a second surface of the flexible substrate.

In the touch screen panel, the plurality of first and second touch electrodes are formed on an upper substrate of a display device.

According to the touch screen panel, it is possible to enhance touch sensibility because a total length of edges of the touch driving electrode and touch sensing electrode opposite to each other are much longer than that of the related art touch screen panel, thereby increasing mutual capacitance.

According to the touch screen panel, it is possible to reduce parasitic capacitance generated between the touch electrodes and electrodes of a display device because a touch sensing electrode is much smaller than that of the related art touch screen panel. Accordingly, it is possible to enhance a charge characteristic of the touch electrodes by reducing time constant value of the touch electrodes, and also to enhance touch sensibility of the touch screen panel by increasing a variation rate of mutual capacitance due to far field between the touch driving electrodes and the touch sensing electrodes.

Also, according to the touch screen panel, it is possible to reduce parasitic capacitance generated between the touch sensing electrodes and the touch sensing electrodes because there are a plurality of dummy patterns in a space formed between the touch driving electrode and the touch sensing electrode, and the space formed the touch driving electrodes which are neighbored to each other. Accordingly, it is possible to enhance touch sensibility of the touch screen panel by decreasing time constant values of the touch driving electrodes and the touch sensing electrodes to increase the charge characteristic of them.

BRIEF DESCRIPTION OF THE DRAWINGS

The teachings of the embodiments can be readily understood by considering the following detailed description in conjunction with the accompanying drawings.

DETAILED DESCRIPTION OF THE EMBODIMENTS OF THE INVENTION

Figure 1:
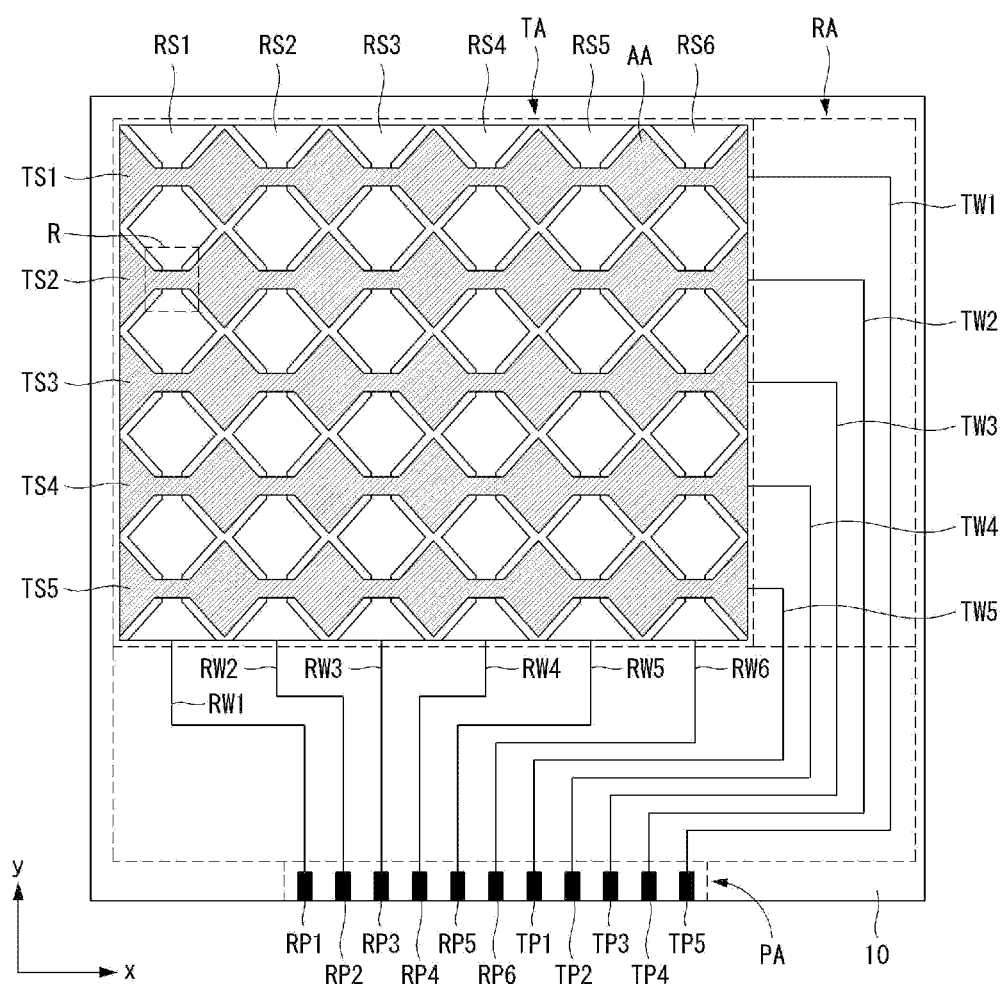
FIG. 1 is a top plan view of a related art electrostatic capacitive type touch screen panel.
Figure 2A:
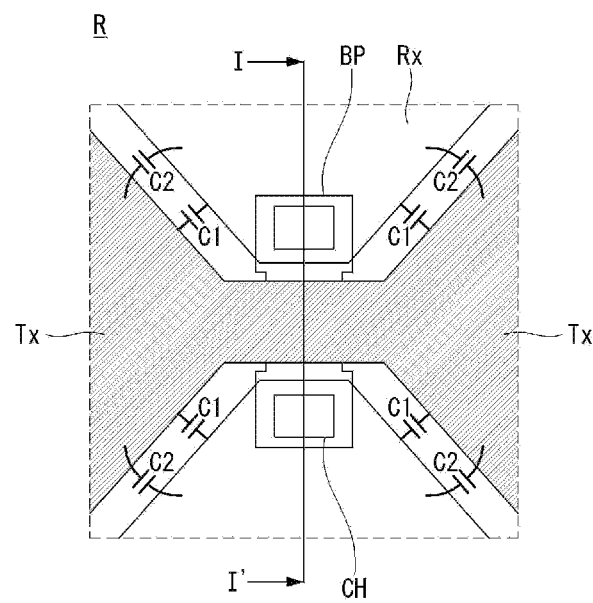
FIG. 2A is a top plan view of a region R shown in FIG. 1.
Figure 2B:
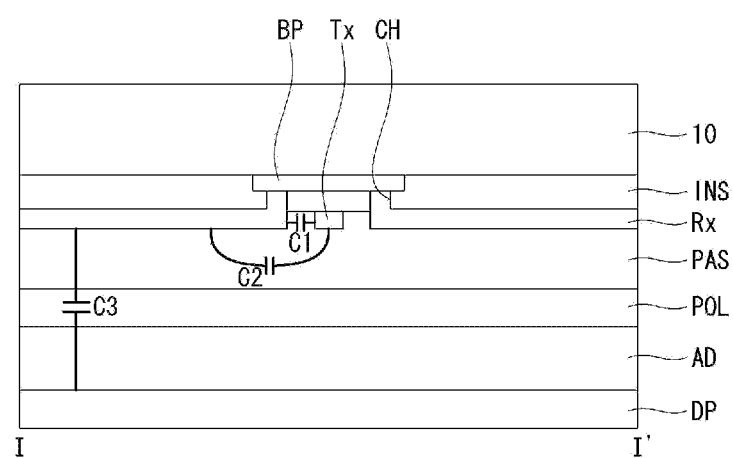
FIG. 2B is a cross-sectional view taken along line IT of region R shown in FIG. 2A in which the related art electrostatic capacitive type touch screen panel is coupled with a display device.

Hereinafter, exemplary embodiments of the present invention will be described in detail with reference to the accompanying drawings, wherein same reference numerals may be used to denote the same or substantially the same elements throughout the specification and the drawings. The terminology "electrode serial" recited in this disclosure means that a plurality of electrode patterns are connected to each other to form one conductive line.

Figure 3:
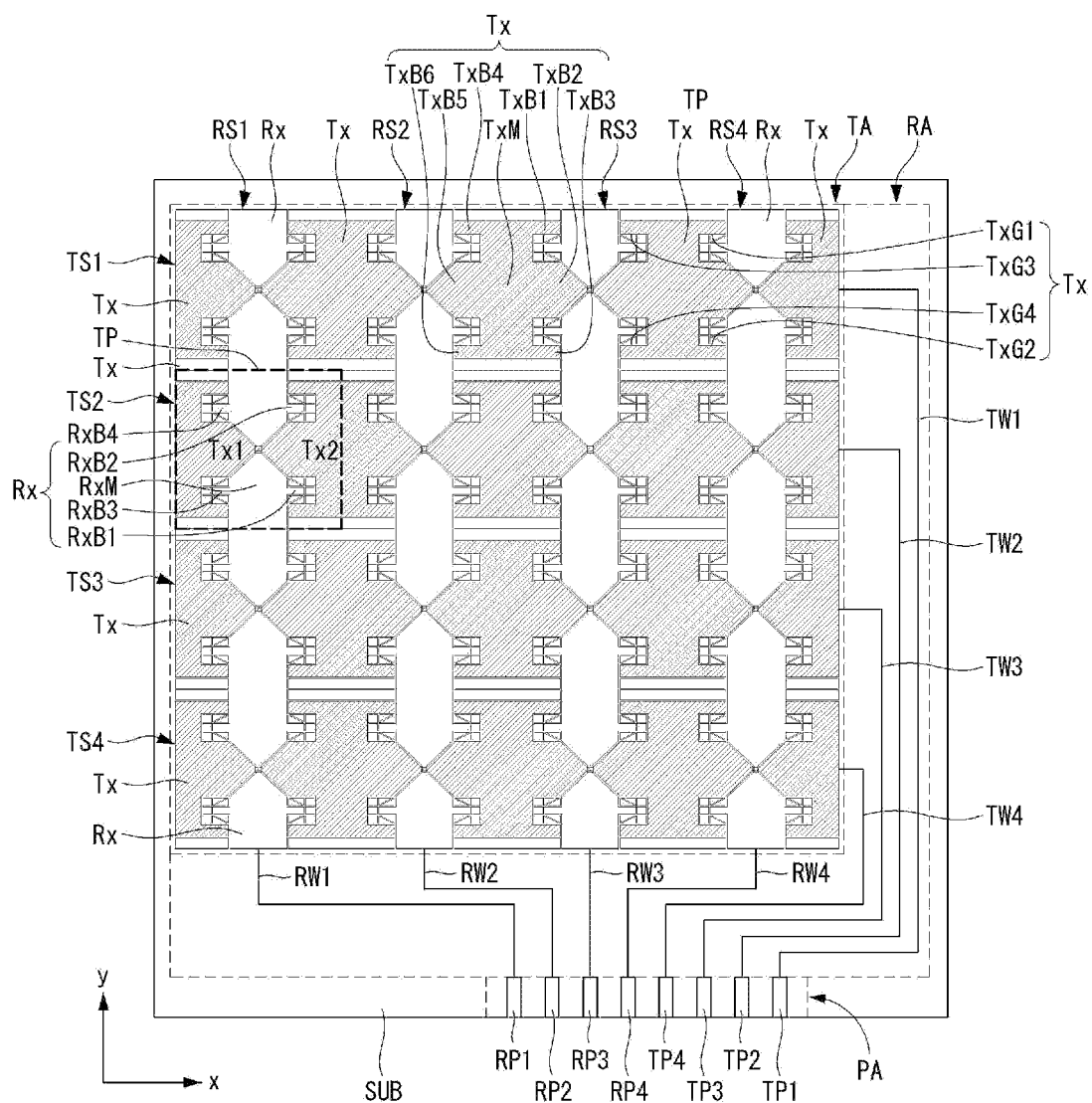
FIG. 3 is a top plan view illustrating a touch screen panel according to one embodiment.

An electrostatic capacitive type touch screen panel according to an exemplary embodiment of this disclosure is described in detail with reference to FIG. 3. FIG. 3 is a top plan view illustrating a touch screen panel according to one embodiment of the invention.

Referring to FIG. 3, the electrostatic capacitive type touch screen panel (hereinafter, referred to as "the touch screen panel") according to an exemplary embodiment of this disclosure includes an electrode forming part TA in which touch electrodes are formed, a routing wire forming part RA in which routing wires are formed to transmit or receive signals to or from the touch electrodes, and a pad forming part PA in which routing pads are formed to connect the routing wires to signal lines of a touch driving circuit.

The touch electrode forming part TA includes a plurality of first touch electrode serials TS1 to TS4 (touch driving electrode serials or touch sensing electrode serials) and second touch electrode serials RS1 to RS4 (touch sensing electrode serials or touch driving electrode serials). The plurality of first touch electrode serials TS1 to TS4 are arranged in parallel in a first direction (e.g., the x-axis direction). The plurality of second touch electrode serials RS1 to TS4 are arranged in a second direction (e.g., the y-axis direction) to cross over the first touch electrodes TS. Herein, the first touch electrode serials are referred to as touch driving electrode serials, and the second touch electrode serials are referred to as touch sensing electrode serials. However, it should be understood that the reverse is possible. That is, the first touch electrode serials may be touch sensing electrode serials, and the second touch electrode serials may be touch driving electrode serials.

Herein, the terminology "first touch electrode serials" are used together with the touch driving electrode serials, and also the terminology "second touch electrode serials" are used the sensing electrode serials. Accordingly, it should be understood that the first touch electrode serials means the touch driving electrode serials, and also the second touch electrode serials means the sensing electrode serials.

Each of the first electrode serials TS1 to TS4 includes a plurality of first touch electrode patterns Tx which are connected to each other as shown in FIGS. 4A to 7B. Each of the second electrode serials RS1 to TS4 includes a plurality of second touch electrode patterns Rx and a plurality of bridge patterns BR. Each of the plurality of bride patterns BR connects the second touch electrode patterns Rx which are disposed to be neighbored to each other. The second touch electrode patterns Rx are insulated from the first touch electrode patterns Tx by an insulation pattern INS. The neighbored second touch electrode patterns Rx are connected to each other by the bridge pattern BR exposed from both ends of the insulation pattern INS. In this embodiment, the first and second touch electrode patterns Tx and Rx are formed on a substrate SUB.

The first and second touch electrode patterns (that is, touch driving and sensing electrodes) Tx and Rx and bridge patterns BR are formed of transparent conductive material such as ITO (Indium Tin Oxide), IZO (Indium Zinc Oxide), GZO (Gallium-doped Zinc Oxide), transparent conductive material selected from carbon-based conductive material, metal mesh type material, or metal nano wire. The insulation patterns INS are formed of inorganic material such as SiNx, SiO$_2$, or organic material such as photo acryl.

The routing wire forming part RA is formed outside the electrode forming part TA, and includes a plurality of first routing wires TW1 to TW4 and a plurality of second routing wires RW1 to RW4. The plurality of first routing wires TW1 to TW4 are connected to the plurality of first touch electrode serials TS1 to TS4, respectively. And also, the plurality of second touch routing wires RW1 to RW4 are connected to the plurality of second electrode serials RS1 to RS4, respectively. The first and second routing wires TW1 to TW4 and RW1 to RW4 are formed of metal material such as Al, AlNd, Mo, MoTi, Cu, Cr, Ag, Ag-based alloy.

The pad forming part PA includes a plurality of first pads TP1 to TP4 and a plurality of second pads RP1 to RP4. The plurality of first pads TP1 to TP4 are connected to the plurality of first touch electrode serials TS1 to TS4via the plurality of first routing wires TW1 to TW4, respectively. The plurality of second pads RP1 to RP4 are connected to the plurality of second touch electrode serials RS1 to RS4 via the plurality of second routing wires RW1 to RW4, respectively. The first and second pads TP1 to TP4 and RP1 to RP4 are formed of metal material such as Al, AlNd, Mo, MoTi, Cu, Cr, Ag, Ag-based alloy.

The first and second touch electrode patterns Tx and are described in detail with reference to FIGS. 3 to 7B.

Figure 4A:
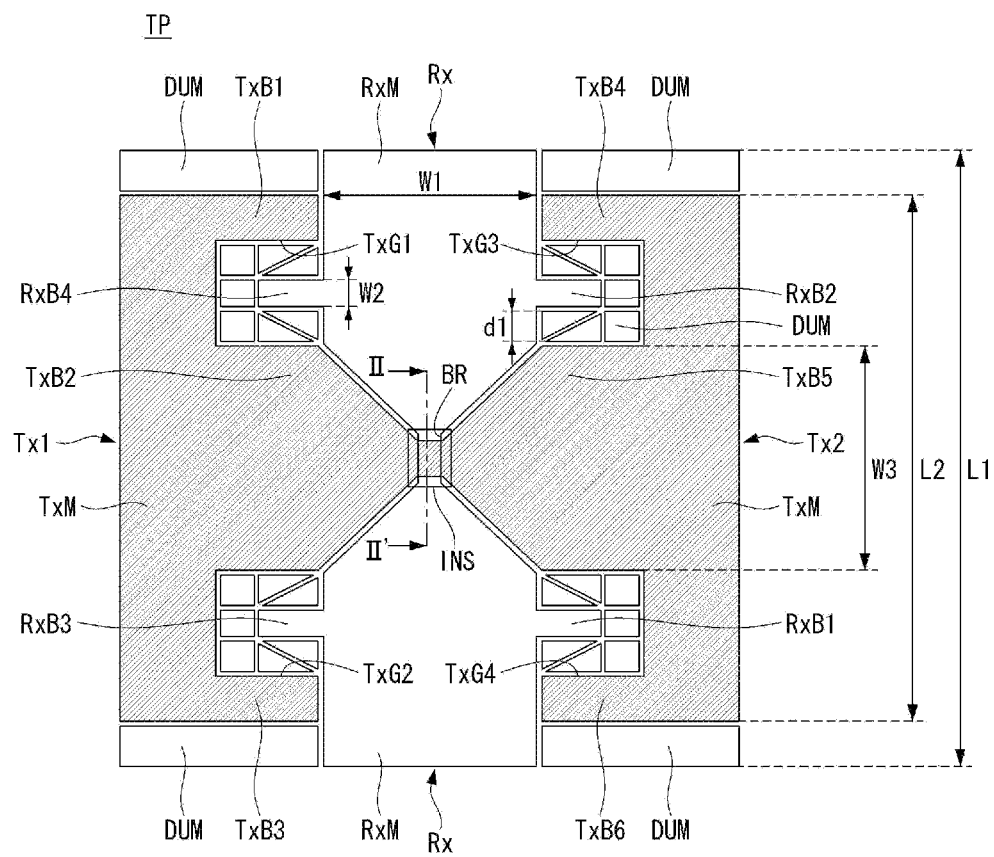
FIG. 4A is a top plan view illustrating a first example of the first touch electrodes (touch driving electrodes or touch sensing electrodes) and second touch electrodes (touch sensing electrodes or touch driving electrodes) shown in FIG. 3.
Figure 4B:
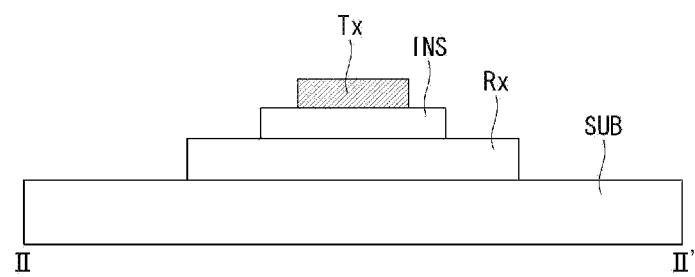
FIG. 4B is a cross-sectional view taken along line II-IF of FIG. 4A.

FIG. 4A is a top plan view illustrating a first example of the first touch electrodes (touch driving electrodes or touch sensing electrodes) and second touch electrodes (touch sensing electrodes or touch driving electrodes) shown in FIG. 3 and FIG. 4B is a cross-sectional view taken along line II-IF of FIG. 4A.

FIG. 3 shows the touch screen panel to which the first touch electrodes (touch driving electrodes) and second touch electrodes shown in FIG. 3 are applied. The touch driving electrode Tx is similarly formed of "王" shape, and the touch sensing electrode Rx is similarly formed of "ǂ".

Referring to FIGS. 3 and 4A, the touch driving electrode Tx includes a first stem portion TxM, and first branch portions TxB1 to TxB6 outwardly extended from both sides of the first stem portion TxM. The first branch portions TxB1 to TxB6 include a 1-1 to 1-6 branch portions TxB1 to TxB6. The 1-1 branch portion TxB1 is extended from an upper part of the first stem portion TxM to right side. The 1-2 branch portion TxB2 is extended from a middle part of the first stem portion TxM to right side. The 1-3 branch portion TxB3 is extended from a lower part of the first stem portion TxM to right side. The 1-4 branch portion TxB4 is extended from the upper part of the first stem portion TxM to left side. The 1-5 branch portion TxB5 is extended from the middle part of the first stem portion TxM to left side. The 1-6 branch portion TxB6 is extended from the lower part of the first stem portion TxM to left side.

A first concave TxG1 is formed by the 1-1 branch portion TxB1, the first stem portion TxM and the 1-2 branch portion TxB2 of the touch driving electrode Tx. In similar, second to fourth concaves TxG2 to TxG4 are formed. That is, the second concave TxG2 is formed by the 1-2 branch portion TxB2, the first stem portion TxM and the 1-3 branch portion TxB3, the third concave TxG3 is formed by the 1-4 branch portion TxB4, the first stem portion TxM and the 1-5 branch portion TxB5, and the 1-4 concave TxG4 is formed by the 1-5 branch portion TxB5, the first stem portion TxM and the 1-6 branch portion TxB6.

The 1-1, 1-3, 1-4 and 1-6 branch portions TxB1, TxB3, TxB3 and TxB6 of the touch driving electrode Tx are formed of a shape similar to rectangular shape. The 1-2 and 1-5 branch portions TxB2 and TxB5 are formed of a shape combined of triangular shape and rectangular shape so that an apex of the triangular shape is disposed at outwardly end. And also, each of the 1-2 and 1-5 branch portions TxB2 and TxB5 is larger than each of the 1-1, 1-3, 1-4 and 1-6 branch portions TxB1, TxB3, TxB4 and TxB6.

The 1-1 to 1-3 branch portions TxB1, TxB2 and TxB3 and the 1-4 to 1-6 branch portions TxB4, TxB5 and TxB6 are formed to be symmetrical to each other.

Referring to FIGS. 3 and 4A, the touch seining electrode Rx includes a second stem portion RxM, and second branch portions RxB1 to RxB4 from outwardly extended from the second stem portion RxM. The second branch portions include 2-1 to 2-4 branch portions RxB1 to RxB4. The 2-1 branch portion RxB1 of the touch sensing electrode Rx is formed at a predetermined distance from a top end of the second stem portion RxM and extended from of the second stem portion RxM to right side. The 2-2 branch portion RxB2 is formed at the predetermined distance from a bottom end of the second stem portion RxM and extended from the second stem portion RxM to right side. The 2-3 branch portion RxB3 is formed at the predetermined distance from the top end of the second stem portion RxM and extended from the second stem portion RxM to left side. The 2-4 branch portion RxB4 is formed at the predetermined distance from the bottom end of the second stem portion RxM and extended from the second stem portion RxM to left side.

The 2-1 to 2-4 branch portions RxB1 to RxB4 of the touch sensing electrodes Rx has a same or similar shape. For example, each of the 2-1 to 2-4 branch portions RxB1 to RxB4 of the touch sensing electrodes Rx has a rectangular shape.

The 2-1 and 2-2 branch portions RxB1 and RxB2 of the touch sensing electrodes Rx and the 2-3 and 2-4 branch portions RxB3 and RxB4 of the touch sensing electrodes Rx are formed to be symmetrical to each other.

The width W1 of the second stem RxM of the touch sensing electrode Rx has a size of ⅕ to ⅗ of the length L1 of the touch sensing electrode Rx. Width W2 of each of the 2-1 to 2-4 branch portions RxB1 to RxB4 has a size of ¼ to ¾ of the width W1 of the second stem RxM of the touch sensing electrode Rx.

Combination construction of the mentioned above touch driving electrode Tx and touch sensing electrode Rx is described. Referring to FIG. 4A, the 2-4 branch portion RxB4 of the touch sensing electrode Rx1 is disposed within the first concave TxG1 of the touch driving electrode Tx1. The 2-3 branch portion RxB3 of the touch sensing electrode Rx2 which is neighbored to the touch sensing electrode Rx1 is disposed within the second concave TxG2 of the touch driving electrode Tx1. The 2-2 branch portion RxB2 of the touch sensing electrode Rx1 is disposed within the third concave TxG3 of the touch driving electrode Tx2 which is neighbored to the touch driving electrode Tx1. The 2-1 branch portion RxB1 of the touch sensing electrode Rx1 is disposed within the fourth concave TxG4 of the touch driving electrode Tx2 which is neighbored to the touch driving electrode Tx1.

The width W3 of each of the 1-2 and 1-5 branch portions TxB2 and RxB5 of the touch driving electrode Tx is substantially same to the width W1 of the second stem portion RxM of the touch sensing electrode Rx. The width of each of the 1-1, 1-3, 1-4 and 1-6 branch portions TxB1, RxB3, RxB4 and RxB6 of the touch driving electrode Tx is smaller than the width of each of the 1-2 and 1-5 branch portions TxB2 and TxB5 of the touch driving electrode Tx.

The distance between the 2-1 to 2-4 branch portions RxB1 to RxB4 of the touch sensing electrode Rx disposed within the first to fourth concaves TxG1 to TxG4 of the touch driving electrode TX and the touch driving electrode Tx is set to a range of ¹⁄₄₀ to ¹⁄₂₀ of the length L1 of the touch sensing electrode Rx. The length L2 of the touch driving electrode Tx is shorter than the length L1 of the touch sensing electrode Rx.

A plurality of dummy patterns DUM having a predetermined shape are disposed in spaces formed between the touch driving electrode Tx and the 2-1 to 2-4 branch portion RxB1 to RxB4 of the touch sensing electrode Rx disposed within the first to fourth concaves TxG1 to TxG4 of the touch driving electrode Tx. However this disclosure does not limit thereto, one dummy pattern is disposed in the spaces. Otherwise, the dummy patterns may be omitted if the dummy pattern is replaced with a touch sensing electrode pattern.

There are some spaces between touch driving electrodes Tx which are neighbored to each other. In the spaces, a plurality of dummy patterns or one dummy pattern is disposed. Otherwise, the dummy patterns may be omitted if the dummy pattern is replaced with a touch driving electrode pattern.

Figure 5A:
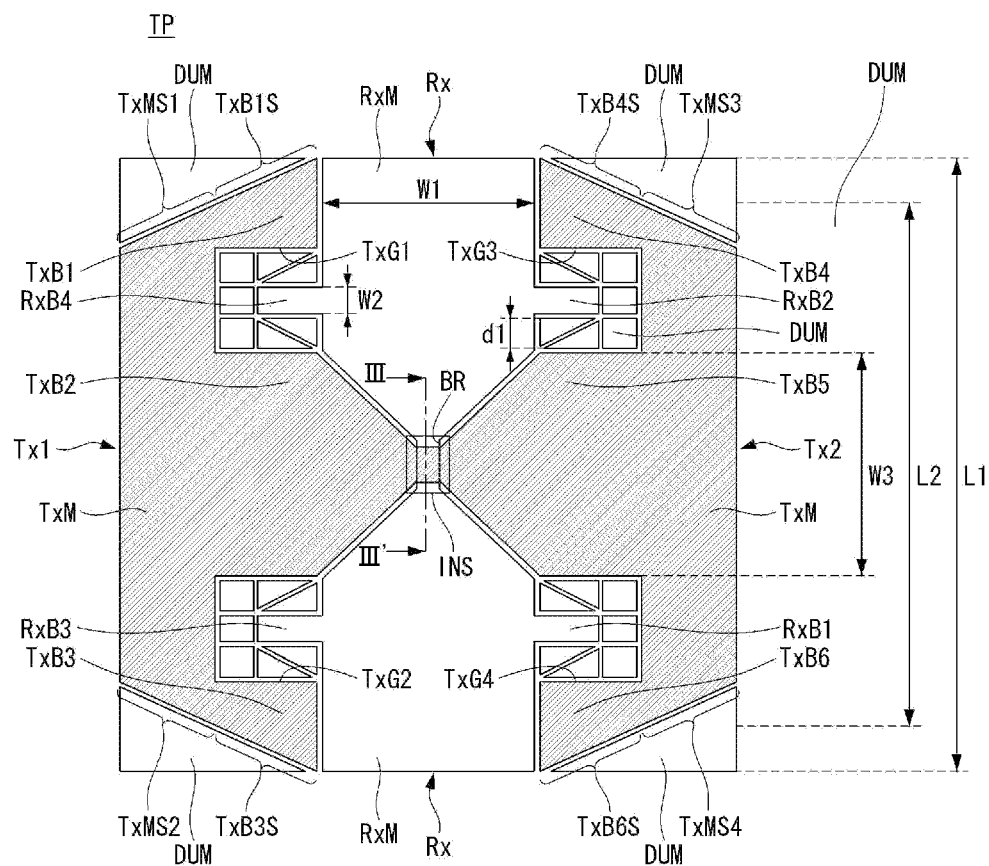
FIG. 5A is a top plan view illustrating a second example of the first touch electrodes (touch driving electrodes or touch sensing electrodes) and second touch electrodes (touch sensing electrodes or touch driving electrodes) shown in FIG. 3.
Figure 5B:
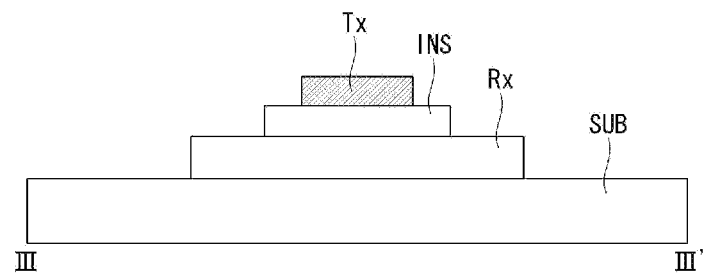
FIG. 5B is a cross-sectional view taken along lines III-III' shown in FIG. 5A.

FIG. 5A is a top plan view illustrating a second example of the first touch electrodes (touch driving electrodes) and second touch electrodes (touch sensing electrodes) shown in FIG. 3, and FIG. 5B is a cross-sectional view taken along lines III-III' shown in FIG. 5A.

The touch driving electrode Tx according to the second example of this disclosure is substantially same to the touch driving electrode Tx according to the first example excluding that the upper side of the first stem portion TxM of the touch driving electrode Tx and a portion of the 1-1, 1-3, 1-4 and 1-6 branch portions TxB1, TxB3, TxB4, and TxB6 are removed, and the length L2 of the touch driving electrode Tx according to the second example is longer than that of the touch driving electrode Tx according to the first example.

As shown in FIG. 5A, the top end of the first stem TxM of the touch driving electrode Tx has a first slope surface TxMS1 which is upwardly inclined to right upper corner of the 1-1 branch portion TxB1. The 1-1 branch portion TxB1 has a slope surface TxB1S which is extended from the first slope surface TxMS1 and upwardly inclined to right upper corner of the 1-1 branch portion TxB1.

The top end of the first stem TxM of the touch driving electrode Tx has a third slope surface TxMS3 which is upwardly inclined to left upper corner of the 1-4 branch portion TxB4. The 1-4 branch portion TxB4 has a slope surface TxB4S which is extended from the third slope surface TxMS3 and upwardly inclined to left upper corner of the 1-4 branch portion TxB4.

According to the mentioned above construction, there is a space having V shape at upper side of the touch driving electrode Tx. A plurality of dummy patterns DUM or one dummy pattern is disposed in the space.

The lower end of the first stem TxM of the touch driving electrode Tx has a second slope surface TxMS2 which is declined to right lower corner of the 1-3 branch portion TxB3. The 1-3 branch portion TxB3 has a slope surface TxB3S which is extended from the second slope surface TxMS2 and declined to right lower corner of the 1-3 branch portion TxB3.

The lower end of the stem TxM of the touch driving electrode Tx has a 1-4 slope surface TxMS4 which is declined to left lower corner of the 1-6 branch portion TxB6. The 1-6 branch portion TxB6 has a slope surface TxB6S which is extended from the 1-4 slope surface TxMS4 and declined to left lower corner of the 1-6 branch portion TxB6.

According to the mentioned above construction, there is a space having reverse V shape at lower side of the touch driving electrode Tx. A plurality of dummy patterns DUM or one dummy pattern is disposed in the space.

Figure 6A:
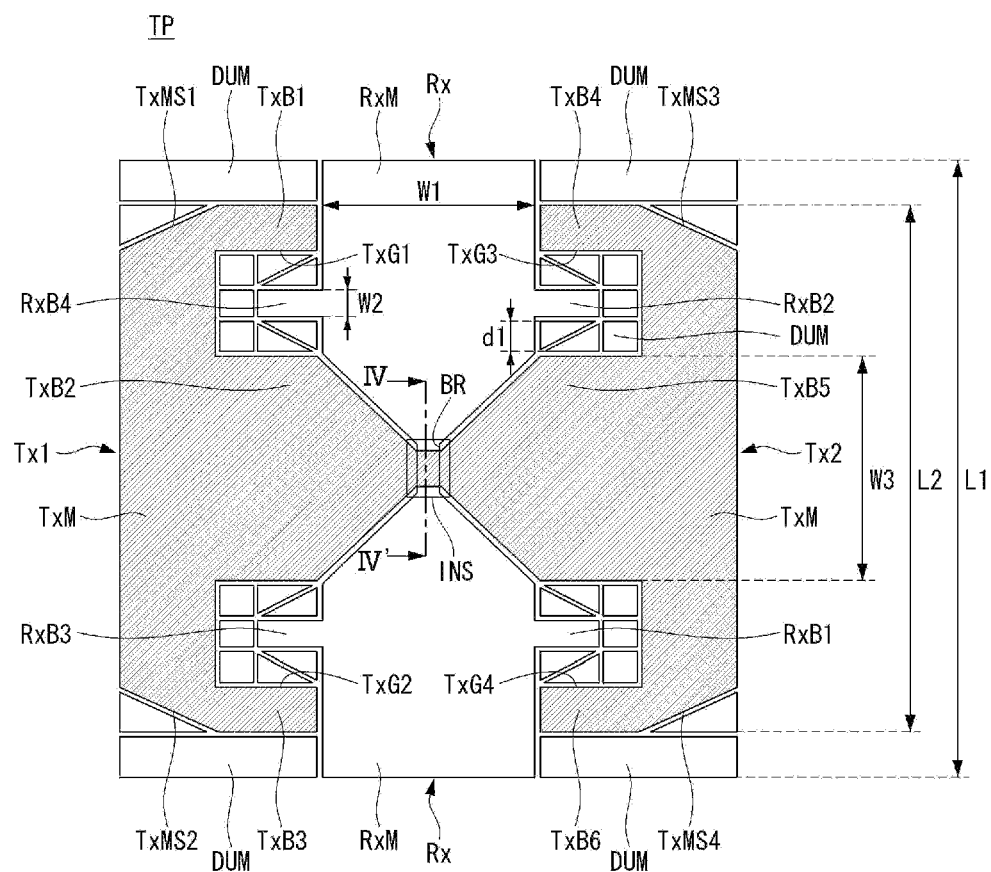
FIG. 6A is a top plan view illustrating a third example of the first touch electrodes (touch driving electrodes or touch sensing electrodes) and second touch electrodes (touch sensing electrodes or touch driving electrodes) shown in FIG. 3.
Figure 6B:
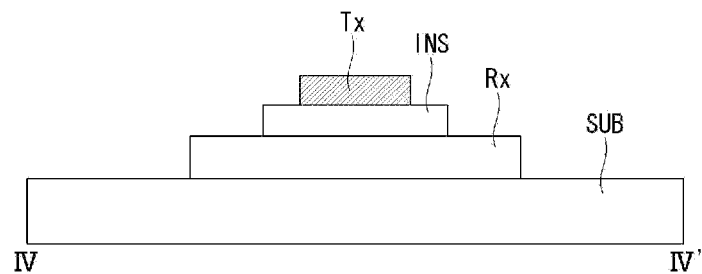
FIG. 6B is a cross-sectional view taken along lines IV-IV' shown in FIG. 6A.

FIG. 6A is a top plan view illustrating a third example of the first touch electrodes (touch driving electrodes) and second touch electrodes (touch sensing electrodes) shown in FIG. 3, and FIG. 6B is a cross-sectional view taken along lines IV-IV' shown in FIG. 6A.

The touch driving electrode Tx shown in FIG. 6A according to the third example of this disclosure is substantially same to the touch driving electrode Tx according to the first example excluding that the upper side of the first stem portion TxM of the touch driving electrode Tx.

As shown in FIG. 6A, the top end of the first stem TxM of the touch driving electrode Tx has a first slope surface TxMS1 which is upwardly inclined to left upper corner of the 1-1 branch portion TxB1. Also, the top end of the first stem TxM of the touch driving electrode Tx has a third slope surface TxMS3 which is upwardly inclined to right upper corner of the 1-4 branch portion TxB4.

According to the mentioned above construction, there is a space at upper side of the touch driving electrode Tx. A plurality of dummy patterns DUM or one dummy pattern is disposed in the space.

The lower end of the first stem TxM of the touch driving electrode Tx has a second slope surface TxMS2 which is declined to left lower corner of the 1-3 branch portion TxB3. Also, the lower end of the first stem TxM of the touch driving electrode Tx has a fourth slope surface TxMS4 which is declined to right lower corner of the 1-6 branch portion TxB6.

According to the mentioned above construction, there is a space having V shape at lower side of the touch driving electrode Tx. A plurality of dummy patterns DUM or one dummy pattern is disposed in the space.

Figure 7A:
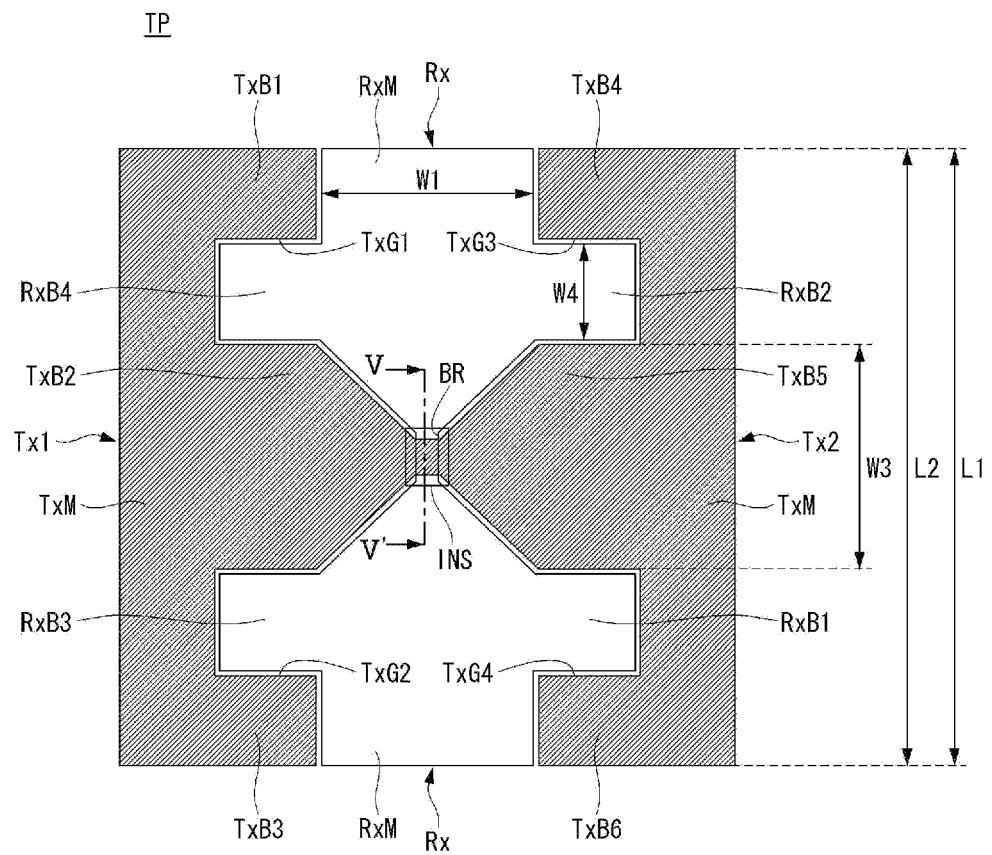
FIG. 7A is a top plan view illustrating a fourth example of the first touch electrodes (touch driving electrodes or touch sensing electrodes) and second touch electrodes (touch sensing electrodes or touch driving electrodes) shown in FIG. 3.
Figure 7B:
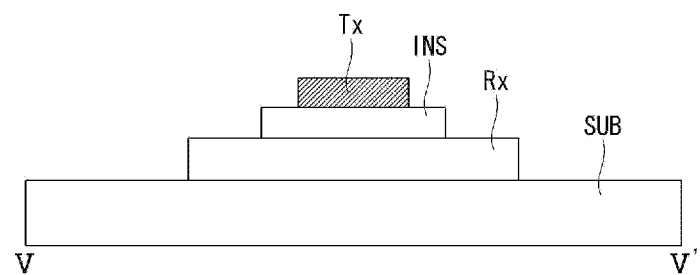
FIG. 7B is a cross-sectional view taken along lines V-V' shown in FIG. 7A.

FIG. 7A is a top plan view illustrating a fourth example of the first touch electrodes (touch driving electrodes) and second touch electrodes (touch sensing electrodes) shown in FIG. 3, and FIG. 7B is a cross-sectional view taken along lines IV-IV' shown in FIG. 7A.

The touch driving electrode Tx shown in FIG. 7A according to the fourth example of this disclosure is substantially same to the touch driving electrode Tx according to the first example excluding that the length L2 of the touch driving electrode Tx is substantially same to the length L1 of the touch sensing electrode Rx, the width W4 of each of the branch portions RxB1, RxB2, RxB3 and RxB4 of the touch sensing electrode Rx is larger than the width W2 the branch portion of the touch sensing electrode Rx according to the first example, and the dummy electrodes are omitted. Accordingly, the detailed description touch driving and sensing electrodes according to the fourth example is omitted to avoid overlapped description.

In the touch screen panel according to the first to fourth examples, the total length of edges of the touch driving electrode and touch sensing electrode opposite to each other are longer than that of the related art touch screen panel because the touch driving electrode and touch sensing electrode have a plurality of branch portions and concaves in one touch pixel TP. Accordingly, is possible to enhance touch sensibility the touch screen panel by increasing mutual capacitance between the touch driving electrodes and the touch sensing electrodes.

Also, in the touch screen panels according to the first to fourth examples, it is possible to reduce parasitic capacitance formed between the touch sensing electrodes and electrodes of a display device if the touch screen panels are applied to the display device because the size of the touch sensing electrode is smaller than that of the related art touch sensing electrode. Accordingly, is possible to enhance touch sensibility the touch screen panel by decreasing time constant values of the touch driving electrodes and the touch sensing electrodes to increase the charge characteristic of them.

Also, in the touch screen panel according to the first to fourth examples, there are a plurality of dummy patterns in the space formed between touch driving electrode Tx and the touch sensing electrode Rx, and the space formed the touch driving electrodes Tx which are neighbored to each other. It reduces parasitic capacitance formed therebetween due to the dummy patterns. Accordingly, is possible to enhance touch sensibility the touch screen panel by decreasing time constant values of the touch driving electrodes and the touch sensing electrodes to increase the charge characteristic of them.

Various examples that the touch screen panel having the touch driving electrodes and the touch sensing electrodes according to the first to fourth examples are applied to display device are describe with reference to FIGS. 8 to 13 according to the embodiments of the present invention. The touch driving electrodes and the touch sensing drives applied to FIGS. 8 to 13 are equivalent to that of the first to fourth examples described with reference to FIGS. 4A to 7B.

Reference symbol WC shown in FIGS. 8 to 13 indicates a window cover such as a reinforced glass which is disposed over the touch screen panel and prevents the touch screen panel from being damaged by touch operation from fingers or a touch pen. Also a terminology "substrate" means a substance formed of transparent material such as glass, a terminology "film" means a substance formed of plastic-based material such as PET (Polyethylene phthalate). However, the substances are not limited thereto, it should be understood that materials equivalent to the mentioned above materials belong to this disclosure.

Figure 8:
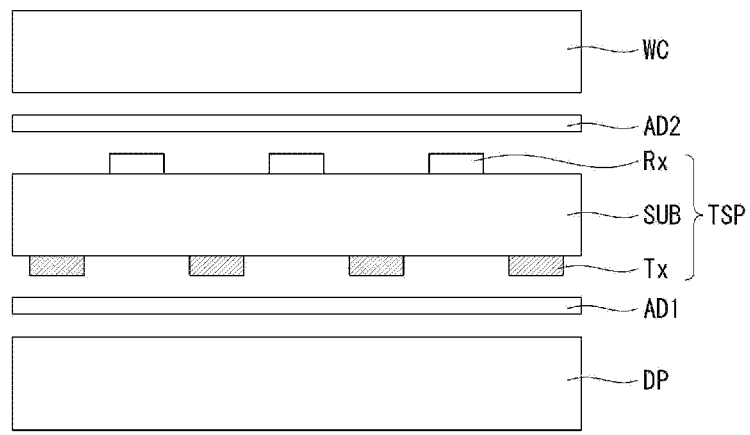
FIG. 8 is a cross-sectional view illustrating a state in which the first and second touch electrodes according to the first to fourth examples are applied to an upper surface and lower surface of a substrate, respectively.

FIG. 8 is a cross-sectional view illustrating a state in which the first and second touch electrodes (touch driving electrodes and touch sensing electrodes) according to the first to fourth examples are applied to an upper surface and lower surface of a substrate, respectively.

As shown in FIG. 8, the touch driving electrodes Tx according to the first to fourth examples are formed on a lower surface of a substrate SUB, and the touch sensing electrodes Rx according to the first to fourth examples are formed on an upper surface of the substrate SUB to construct a touch screen panel TSP. The touch driving electrodes Rx and the touch sensing electrodes Rx of the touch screen panel TSP cross over to each other. The touch screen panel TSP having the touch driving electrodes Rx and the touch sensing electrodes Rx is attached to an upper surface of a display device DP by first adhesive AD1. A window cover WC is attached to an upper surface of the touch screen panel TSP by a second adhesive AD2. The first and second adhesive AD1 and AD2 include a transparent film for adhesion.

Figure 9:
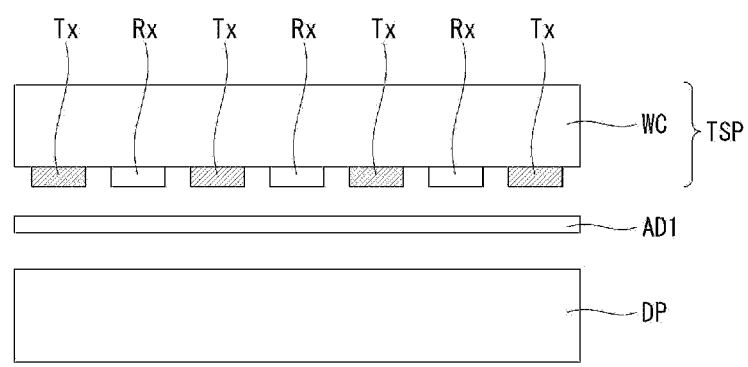
FIG. 9 is a cross-sectional view illustrating another state in which the first and second touch electrodes according to the first to fourth examples are applied to a lower surface of window cover.

FIG. 9 is a cross-sectional view illustrating another state in which the first and second touch electrodes according to the first to fourth examples are applied to a lower surface of window cover.

As shown in FIG. 9, the touch driving electrodes Tx and the touch sensing electrodes Rx according to the first to fourth examples are formed on a lower surface of a window cover WC to cross over each other and are insulated by insulation patterns or an insulation layer (not shown). The touch screen panel TSP including the touch driving and sensing electrodes Tx and Rx are attached to a display device by adhesive AD1. The adhesive AD1 includes a transparent film for adhesion.

Figure 10:
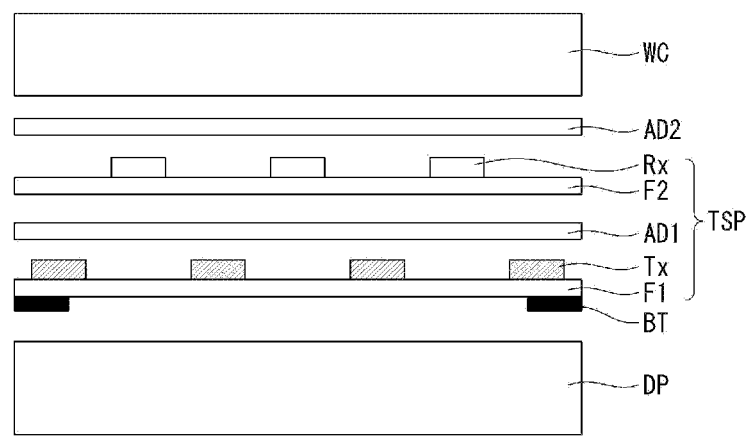
FIG. 10 is a cross-sectional view illustrating a state in which the first and second touch electrodes according to the first to fourth examples are applied to a first substrate and a second substrate, respectively.

FIG. 10 is a cross-sectional view illustrating a state in which the first and second touch electrodes according to the first to fourth examples are applied to a first substrate and a second substrate, respectively.

As shown in FIG. 10, the touch driving electrodes Tx according to the first to fourth examples are formed on an upper surface of a first film F1, and the touch sensing electrodes Rx according to the first to fourth examples are formed on an upper surface of a second film F2 to construct a touch screen panel TSP. A lower surface of the first film F1 and an upper surface of the second film F2 are attached to each other by first adhesive AD1. The touch driving electrodes Rx and the touch sensing electrodes Rx of the touch screen panel TSP cross over to each other. The touch screen panel TSP having the touch driving electrodes Rx and the touch sensing electrodes Rx is attached to an upper surface of a display device DP by a double sided adhesive tape BT attached to the lower surface of the first film F1. A window cover WC is attached to an upper surface of the touch screen panel TSP by a second adhesive AD2. The first and second adhesive AD1 and AD2 include a transparent film for adhesion.

Figure 11:
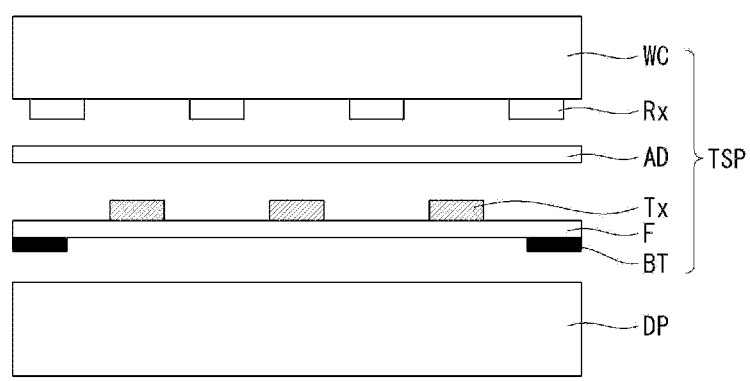
FIG. 11 is a cross-sectional view illustrating another state in which the first and second touch electrodes according to the first to fourth examples are applied to a substrate and a window cover, respectively.

FIG. 11 is a cross-sectional view illustrating another state in which the first and second touch electrodes according to the first to fourth examples are applied to a substrate and a window cover, respectively.

As shown in FIG. 11, the touch driving electrodes Tx according to the first to fourth examples are formed on an upper surface of a film F, and the touch sensing electrodes Rx according to the first to fourth examples are formed on a lower surface of a window cover to construct a touch screen panel TSP. The touch driving electrodes Tx and the touch sensing electrodes Rx are cross over to each other. The window cover WC and the film F are attached to each other by an adhesive AD. The touch screen panel TSP is attached to a display device DP by an adhesive or a both sided adhesive tape BT attached to a lower surface of the film F.

Figure 12:
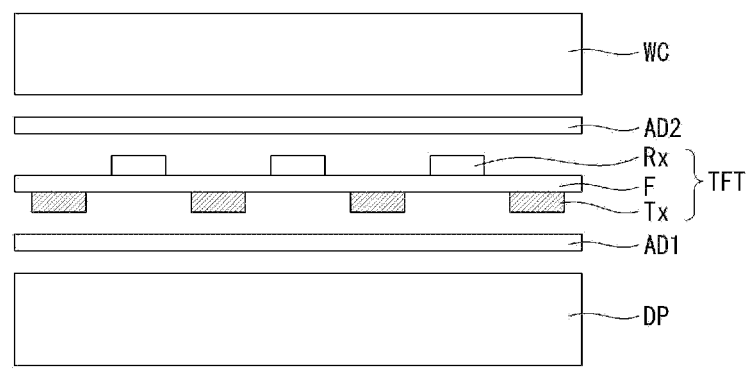
FIG. 12 is a cross-sectional view illustrating another state in which the first and second touch electrodes according to the first to fourth examples are applied to an upper surface and lower surface of a film, respectively.

FIG. 12 is a cross-sectional view illustrating another state in which the first and second touch electrodes according to the first to fourth examples are applied to an upper surface and lower surface of a film, respectively.

As shown in FIG. 12, the touch driving electrodes Tx according to the first to fourth examples are formed on a lower surface of a film F, and the touch sensing electrodes Rx according to the first to fourth examples are formed on an upper surface of an upper substrate of a display device (e.g. a color filter substrate of a liquid crystal display devices, an encapsulator of electroluminescence display device to protect a thin film transistor substrate). The touch driving electrodes Tx and the touch sensing electrodes Rx are cross over to each other and insulated by the film F. The touch screen panel TSP having the touch driving electrodes Tx and the touch sensing electrodes Rx are attached to a display device by the first adhesive AD1. A window cover WC is attached to an upper surface of the touch screen panel TSP by a second adhesive AD2. The first and second adhesive AD1 and AD2 include a transparent film for adhesion.

Figure 13:
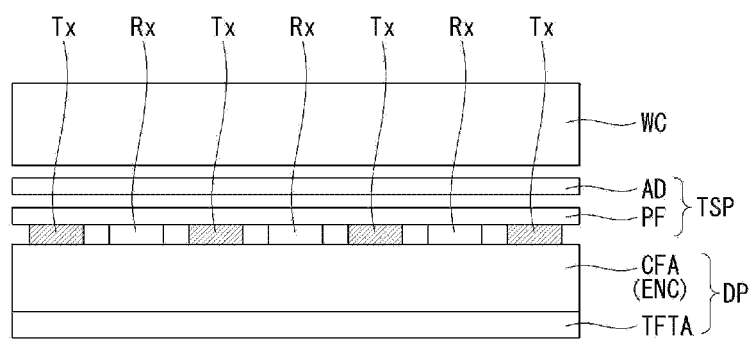
FIG. 13 is a cross-sectional view illustrating another state in which the first and second touch electrodes according to the first to fourth examples are applied to an upper substrate of a display device.

FIG. 13 is a cross-sectional view illustrating another state in which the first and second touch electrodes according to the first to fourth examples are applied to an upper substrate of a display device.

As shown in FIG. 13, the touch driving electrodes Tx and the touch sensing electrodes Rx according to the first to fourth examples are formed on an upper substrate of a display device (e.g. a color filter substrate of a liquid crystal display devices, an encapsulator of electroluminescence display device to protect a thin film transistor substrate). The touch driving electrodes Tx and the touch sensing electrodes Rx are cross over to each other and insulated by insulation patterns (not shown). A protection film PF may be attached on the touch screen panel TSP having the touch driving electrodes Tx and the touch sensing electrodes Rx. A window cover WC is attached to the protection film PF by a adhesive AD.

In the above description with reference to FIGS. 8 to 13, the touch driving electrodes Tx and the touch sensing electrodes Rx according to first to fourth examples are applied to display devices. Herein, it should be understood that the display devices include liquid crystal display devices (LCD), electroluminescence display devices such as organic light emitting diode display device (OLED), field emission display devices (FED), plasma display panels (PDP), and electrophoresis display devices.

From the above description, it will be apparent to those skilled in the art that various changes and modifications can be made without departing from the technical spirit of the present invention. Accordingly, the scope of the present invention should not be limited by the exemplary embodiments, but should be defined by the appended claims.

What is claimed is:

1. A touch screen panel comprising:
a plurality of first touch electrode serials arranged in a first direction; and
a plurality of second touch electrode serials arranged in a second direction crossing over the first direction, and electrically insulated from the plurality of first touch electrode serials,
wherein each of the plurality of first touch electrode serials includes a plurality of first touch electrodes connected in serial, and each of the plurality of second touch electrode serials includes a plurality of second touch electrodes connected in serial,
wherein each of the plurality of first touch electrodes has a first stem portion, and a plurality of first branch portions outwardly extended from both sides of the first stem portion to form at least two concaves in one side of the first touch electrode,
wherein each of the plurality of second touch electrodes has a second stem portion, and a plurality of second branch portions outwardly extended from both sides of the second stem portion to be respectively received in the at least two concaves,
wherein all of the plurality of first branch portions and the plurality of second branch portions are parallel to one another, are only parallel with the first direction, and are perpendicular with the second direction, wherein all edges of the each first touch electrode including the first stem portion and the plurality of first branch portions are parallel to all edges of the each second touch electrode including the second stem portion and the plurality of second branch, wherein the plurality of first branch portions includes:
a 1-1 branch portion outwardly extended from an upper part of the first stem portion to right side in the first direction,
a 1-2 branch portion is extended from a middle part of the first stem portion to right side in the first direction,
a 1-3 branch portion is extended from a lower part of the first stem portion to right side in the first direction,
a 1-4 branch portion is extended from the upper part of the first stem portion to left side in the first direction,
a 1-5 branch portion is extended from the middle part of the first stem portion to left side in the first direction, and
a 1-6 branch portion is extended from the lower part of the first stem portion to left side in the first direction, and wherein the plurality of second branch portions includes:
a 2-1 branch portion of the second touch electrode formed at a predetermined distance from a top end of the second stem portion and extended from of the second stem portion to right side in the first direction,
a 2-2 branch portion formed at the predetermined distance from a bottom end of the second stem portion and extended from the second stem portion to right side in the first direction,
a 2-3 branch portion formed at the predetermined distance from the top end of the second stem portion and extended from the second stem portion to left side in the first direction, and
a 2-4 branch portion formed at the predetermined distance from the bottom end of the second stem portion and extended from the second stem portion to left side in the first direction.

2. The touch screen panel of claim 1,
wherein a first concave is formed by the 1-1 branch portion, the first stem portion and the 1-2 branch portion of the first touch electrode, a second concave is formed by the 1-2 branch portion, the first stem portion and the 1-3 branch portion, a third concave is formed by the 1-4 branch portion, the first stem portion and the 1-5 branch portion, and a fourth concave is formed by the 1-5 branch portion, the first stem portion and the 1-6 branch portion.

3. The touch screen panel of claim 2,
wherein the 2-4 branch portion of the second touch electrode is disposed within the first concave of the first touch electrode, the 2-3 branch portion of the second touch electrode which is neighbored to the second touch electrode is disposed within the second concave of the first touch electrode, the 2-2 branch portion of the second touch electrode is disposed within the third concave of the first touch electrode, the 2-1 branch portion of the second touch electrode is disposed within the fourth concave of the first touch electrode which is neighbored to the first touch electrode.

4. The touch screen panel of claim 3, wherein a top end of the first stem of the first touch electrode has a first slope surface which is upwardly inclined to right upper corner of the 1-1 branch portion, the 1-1 branch portion has a slope surface which is extended from the first slope surface and upwardly inclined to right upper corner of the 1-1 branch portion, and wherein the top end of the first stem of the first touch electrode has a third slope surface which is upwardly inclined to left upper corner of the 1-4 branch portion, and the 1-4 branch portion has a slope surface which is extended from the third slope surface and upwardly inclined to left upper corner of the 1-4 branch portion.

5. The touch screen panel of claim 4, wherein the lower end of the first stem of the first touch electrode has a second slope surface which is declined to right lower corner of the 1-3 branch portion, and the 1-3 branch portion has a slope surface which is extended from the second slope surface and declined to right lower corner of the 1-3 branch portion, and wherein the lower end of the stem of the first touch electrode has a 1-4 slope surface which is declined to left lower corner of the 1-6 branch portion, and the 1-6 branch portion has a slope surface which is extended from the 1-4 slope surface and declined to left lower corner of the 1-6 branch portion.

6. The touch screen panel of claim 3, wherein the top end of the first stem of the first touch electrode has a first slope surface which is upwardly inclined to left upper corner of the 1-1 branch portion, and the top end of the first stem of the first touch electrode has a third slope surface which is upwardly inclined to right upper corner of the 1-4 branch portion.

7. The touch screen panel of claim 6, wherein the lower end of the first stem of the first touch electrode has a second slope surface which is declined to left lower corner of the 1-3 branch portion, and the lower end of the first stem of the first touch electrode has a fourth slope surface which is declined to right lower corner of the 1-6 branch portion.

8. The touch screen panel of claim 3, wherein the 1-1 to 1-3 branch portions of the first touch electrode are symmetrical to the 1-4 to 1-6 branch portions of the first touch electrode, and the 2-1 and 2-2 branch portions of the second touch electrode are symmetrical to the 2-3 and 2-4 branch portions of the second touch electrode.

9. The touch screen panel of claim 1, wherein a width of the second stem portion has a size of $\frac{1}{5}$ to $\frac{3}{5}$ of a length of one of the plurality of second touch electrodes.

10. The touch screen panel of claim 9, wherein a width of each of the 2-1 and 2-4 branch portions of the second touch electrode has a size of $\frac{1}{4}$ to $\frac{3}{4}$ a width of the second stem portion of the second touch electrode.

11. The touch screen panel of claim 1, further comprising:
a plurality of dummy electrodes are disposed in a space formed between the first touch electrode and the second touch electrode.

12. The touch screen panel of claim 1, wherein the plurality of first touch electrodes are formed on a first surface of a transparent substrate and the plurality of second touch electrodes are formed on a second surface of the transparent substrate.

13. The touch screen panel of claim 1, wherein the plurality of first touch electrodes and the plurality of second touch electrodes are formed on a window cover.

14. The touch screen panel of claim 1, wherein the plurality of first touch electrodes are formed on a first flexible substrate, the plurality of second touch electrodes are formed on a second flexible substrate, and the first and second flexible substrate are attached to each other by a transparent file for an adhesive.

15. The touch screen panel of claim 1, wherein the plurality of first touch electrodes are formed on a flexible substrate, the plurality of second touch electrodes are formed on a window cover, and the flexible substrate and the window cover are attached to each other by a transparent file for an adhesive.

16. The touch screen panel of claim 1, wherein the plurality of first touch electrodes are formed on a first surface of a flexible substrate, the plurality of second touch electrodes are formed on a second surface of the flexible substrate.

17. The touch screen panel of claim 1, wherein the plurality of first and second touch electrodes are formed on an upper substrate of a display device.

18. The touch screen panel of claim 1, wherein each of the first touch electrode serials is insulated from each of the second touch electrode serials by an insulation pattern disposed on a crossing of the first and second touch electrode serials.

19. The touch screen panel of claim 1, wherein lengths of the plurality of first touch electrodes in the second direction are shorter than lengths of the plurality of second touch electrodes in the second direction.

20. The touch screen panel of claim 1, wherein all of the plurality of first branch portions and the plurality of second branch portions lack parts that extend parallel with the second direction.

* * * * *